United States Patent

[11] 3,582,892

[72] Inventors Hans Y. Juliusburger
Putnam Valley;
George R. Stilwell, Jr., West Nyack, both of, N.Y.
[21] Appl. No. 771,583
[22] Filed Oct. 29, 1968
[45] Patented June 1, 1971
[73] Assignee International Business Machines Corporation
Armonk, N.Y.

[54] SENSE, STORE AND INTERLOCK MATRIX CIRCUIT FOR A SWITCHING DEVICE
16 Claims, 3 Drawing Figs.

[52] U.S. Cl. 340/166, 340/152
[51] Int. Cl. H04q 3/00
[50] Field of Search 340/152, 166

[56] References Cited

UNITED STATES PATENTS 3,129,407 4/1964 Paull 340/152X
3,181,121 4/1965 Losch 340/152X
3,274,554 9/1965 Hopper 340/152X
3,300,758 1/1967 Hawley 340/147ILP

*Primary Examiner*—Harold I. Pitts
*Attorneys*—Hanifin and Jancin and John J. Goodwin

ABSTRACT: A circuit is provided which operates in combination with a matrix switch. The circuit senses a switch closure, stores a pair of output signals representative of the closed switch, cancels the effect of a second switch closure or multiple switch closure during the storage period and resets at the end of the storage period. The circuit includes a plurality of transistor latching means connected to the matrix switch, pairs of which are set by switch closures. Clamping diodes are provided to balance the latching means to prevent spontaneous setting. A switch interlock transistor is included to prevent any subsequent switch closures prior to reset from producing an output signal. A transistor arrangement is also included to cancel the output signals when two or more switches are erroneously closed at the same time. At the end of a selected time period, reset transistors are actuated to reset the circuit to its original state.

INVENTORS
HANS Y. JULIUSBURGER
GEORGE R. STILWELL, JR.
BY John J. Goodwin
ATTORNEY

SENSE, STORE AND INTERLOCK MATRIX CIRCUIT FOR A SWITCHING DEVICE

BACKGROUND OF THE INVENTION

Field of the Invention

The field to which this invention pertains is that of electronic circuits which sense selected switching conditions and provide coded output signals representative of the switch closures.

Summary of the Invention

The present invention relates to a circuit for use with an array of switches and can be used with a large number of such switches.

It is an object of the present invention to provide such a circuit which produces and stores coded signals representative of each switch closure.

Another object of the present invention is to provide a circuit which prevents simultaneous closures of two or more switches from producing invalid codes.

Still another object of the present invention is to provide a circuit which prevents additional switch closures within the storage period from upsetting the stored code.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Figure 1A:
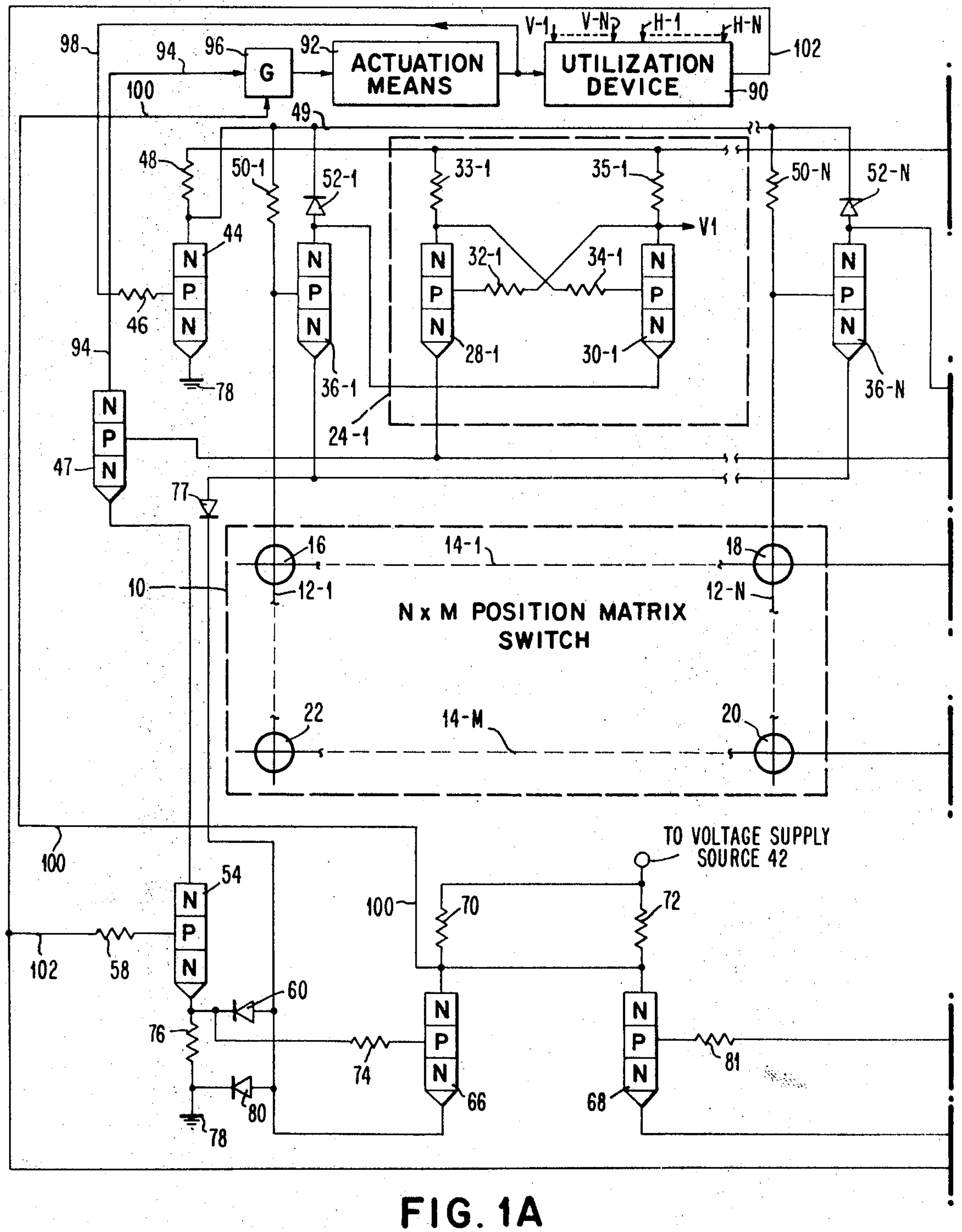
FIGS. 1A and 1B show a schematic diagram of a circuit according to the principles of the present invention when combined as shown in FIG. 1.
Figure 1:
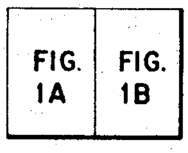
Figure 1B:
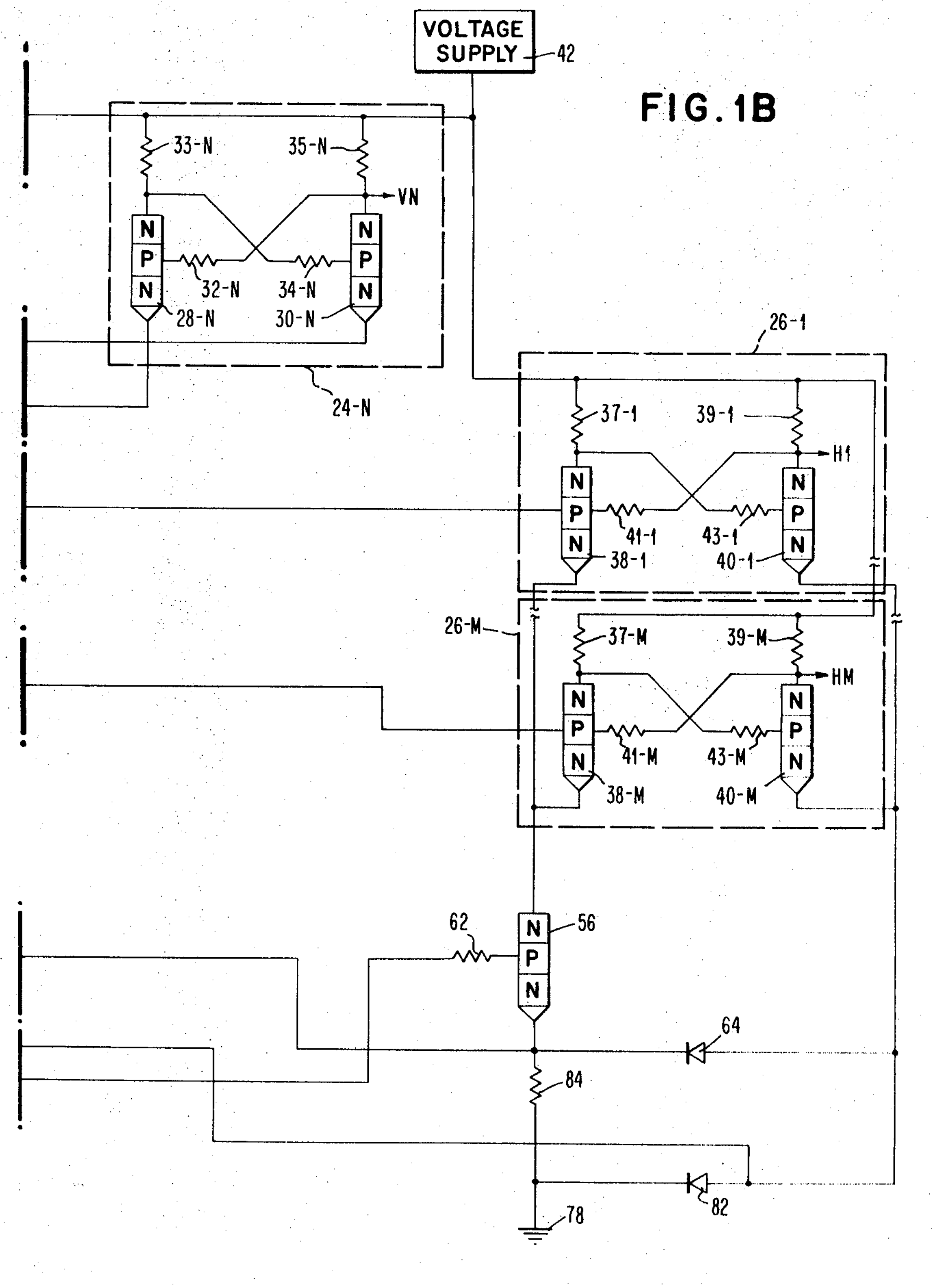

FIGS. 1A and 1B show a circuit embodiment of the present invention for use in combination with a switching matrix of the type wherein horizontal and vertical conductors are selectively brought into contact by the closure of related switch points. The circuit of the present invention includes latching means for the horizontal and vertical conductors which are selectively set to produce output signals upon the closure of a switch point. The latching means remains set until the occurrence of a reset signal. The circuit of FIGS. 1A and 1B also includes clamping diodes which balance the latching means to prevent any one of the latching means from spontaneously setting itself.

The circuit further includes a switch interlock means which insures that further switch closures prior to the occurrence of the reset signal have no effect on the latching means and a multiple switch closure interlock means is provided to provide a "lock" signal when two or more switches are closed at the same time.

In FIGS. 1A and 1B, a N×M switching matrix 10 is shown having M horizontal conductors and N vertical conductors. For clarity, only the first and last vertical conductors 21–1 and 12–N are shown and only the first and last horizontal conductors 14–1 and 14–M are shown. The horizontal and vertical conductors are normally separated and are selectively brought into electrical contact by a switch closure at each of the N×M intersection points. The switch may be a pushbutton, a relay or any suitable switching device. One type of switching matrix suitable for use in the present invention is the elastic diaphragm switch shown in U.S. Pat. No. 3,308,253, issued Mar. 7, 1967, in the name of M. Krakinowski and assigned to the present assignee.

Four switches are referenced in FIGS. 1A and 1B as 16, 18, 20 and 22. Switch 16, for example, when closed connects conductors 12–1 and 14–1. Thus, a unique pair of conductors (one horizontal and one vertical) are connected for each of the N×M switch closures and an electrical circuit path is established between the horizontal and vertical conductors.

Vertical conductors 12–1 to 12–N are connected to separate latching means 24–1 up to 24–N respectively and horizontal conductors 14–1 to 14–M are connected to latching means 26–1 up to 26–M respectively. For clarity, only latching means 24–1, 24–N, 26–1 and 26–M are shown. Latching means 24–2 to 24–(N–1) and latching means 26–2 to 26–(M–1) are not shown, but are identical to latching means 24–1 and 26–1 respectively. Each of the latching means consists of a pair of interconnected transistors 28–1 and 30–1 through 28–N and 30–N for latching means 24–1 through 24–N and 38–1 and 40–1 through 38–M and 40–M for latching means 26–1 through 26–M. Latching means 24–1, which is identical to the other latching means through 24–N, includes transistors 28–1 and 30–1. Transistor 28–1 has its base electrode connected to the collector electrode of transistor 30–1 through a resistor 32–1 and transistor 30–1 has its base electrode connected to the collector electrode transistor 28–1 through a resistor 34–1. Conductor 12–1 is connected to latching means 24–1 through a gating transistor 36–1 and the other conductors 12–2 through 12–N are similarly connected to the other latching means 24–2 through 24–N through similar gating transistors 36–2 through 36–N. Only gating transistors 36–1 and 36–N are shown for purposes of clarity. The emitters of gating transistors 36–1 through 36–N are connected to ground potential 78 via diodes 77 and 80.

Latching means 26–1, which is identical to the other latching means through 26–M, also consists of two transistors 38–1 and 40–1. The base of one transistor is connected to the collector of the other transistor through resistors 41–1 and 43–1. Conductor 14–1 is connected directly to the base of transistor 38–1 and the other conductors up to 14–M are similarly connected to the bases of the corresponding transistors up to 38–M of the other latching means up to 26–M. The emitters of the transistors 40–1 to 40–M are connected to ground potential via a diode 82.

The collector electrodes of the two transistors in each of the latching means 24–1 to 24–N and 26–1 to 26–M are connected through resistors, such as 33–1, 35–1, 37–1 and 39–1, to a source of supply voltage 42. Each of the latching means can provide an output signal on an output lead connected to the collector of the second transistor in the latching means, i.e., the transistors 30–1 to 30–N and the transistors 40–1 to 40–M. The output leads are designated V–1 through V–N and H–1 through H–N. In addition to the latching means, the circuit includes a locking transistor 44 which, when conducting, inhibits the setting of any subsequent latching means in the period between a first switch closure and the occurrence of a reset signal. A switch interlock signal is applied through a resistor 46 connected to the base of locking transistor 44. The collector of transistor 44 is connected through a resistor 48 to the source of supply voltage 42. The collector of transistor 44 is also connected through lead 49 and resistors 50– 1 to 50–N to the base of each of the gating transistors 36–1 to 36–N associated with the latching means 24–1 through 24–N. The collector of locking transistor 44 is also connected to the collector of each of the gating transistors 36–1 to 36–N via diodes 52–1 to 52–N and to a "switch locked" lead 49.

Two reset transistors 54 and 56 and a strobe transistor 47 are also provided. A reset signal is applied to the base of the reset transistor 54 via resistor 58. The collector of reset transistor 54 is connected to the emitter of strobe transistor 47, and the base of strobe transistor 47 is connected to the emitters of each of the transistors 28–1 through 28–N of the latching means 24–1 through 24–N. The emitter of reset transistor 54 is connected between diodes 77 and 80 through a diode 60. The emitter of reset transistor 54 is also connected to a latching resistance 76 which in turn is connected to ground potential 78.

The collector of reset transistor 56 is connected to the emitter of each of the transistors 38–1 through 38–M of latching means 26–1 through 26–M. The reset signal is also applied to the base of reset transistor 56 via resistor 62. The emitter of reset transistor 56 is connected through a diode 64 to the emitter of each of the transistors 40–1 through 40–M of latching means 26–1 through 26–M. The emitter of reset transistor 56 is also connected to a latching resistance 84 which in turn is connected to ground potential 78.

Another feature of the present circuit is a multiple switch closure lock means which is operative in the event that two or more matrix switches are closed at the same time. The multiple switch closure lock means includes a transistor 66 and a transistor 68. The collectors of transistors 66 and 68 are connected to a source of supply voltage 42 through collector resistors 70 and 72 respectively. The base of transistor 66 is connected to the emitter of reset transistor 54 through resistor 74 and the emitter of transistor 66 is connected between latching resistor 76 and ground potential 78 through diode 80.

The base of transistor 68 is connected to the emitter of reset transistor 56 through resistor 81. The emitter of transistor 68 is connected between latching resistor 84 and ground potential 78 through diode 82. The emitter of transistor 68 is also connected to the emitters of transistors 40–1 through 40–M of latching means 26–1 through 26–M. Lead 100 is connected to the collectors of transistors 66 and 68 and a signal is present thereon when two or more switches are closed at the same time.

As previously stated, a closure of any one of the N×M switches of matrix 10 results in one of latch means 24–1 through 24–N and one of latch means 26–1 through 26–M being set and pairs of output signals appearing on one of leads V–1 through V–N and on one of leads H–1 through H–M. The output signals which appear on the given leads V–1 through V–N and H–1 through H–M provide a code which indicates which particular matrix switch was closed. These signals may be employed in a number of different ways. For example, they can be used to activate a printer, they can be used to activate a card punch or they could be applied to a transmitter for transmission to a remote location. Thus, the leads V–1 through V–N and H–1 through H–M are shown connected to a generalized utilization device 90. The operation of utilization device 90 is commenced by a signal from an actuation means 92. Actuation means 92 applies a signal to utilization device 90 when a switch of matrix 10 is closed. As will be later more fully described, the potential on the collector of strobe transistor 47 changes when a switch is closed. This "switch closed" signal on lead 94 from the collector of strobe transistor 47 is connected through a normally open gate 96 to the actuation means 92 to produce an output signal from actuation means 92. The output signal from actuation means 92 is also connected back through a lead 98 as a switch interlock signal and applied through resistor 46 to the base of locking transistor 44. When the operation of utilization means 90 is completed, a reset signal is generated therefrom on lead 102 which is applied through resistors 58 and 62 to the bases of the reset transistors 54 and 56.

If two or more of the switches of matrix 10 are closed at the same time, it is considered an error condition and a multiple switch closure signal will be produced on lead 100 which is connected to the collectors of transistors 66 and 68. Lead 100 is connected to gate 96 to close the gate and prevent the strobe signal on lead 94 from passing through to the actuation means 92. Thus, utilization means 90 will not be operative in the event of a multiple switch closure condition. Gate 96 is a well-known device and actuation means 92 and the portion of utilization means 90 that produces the reset signal consists of conventional trigger circuits well-known to one skilled in the art.

The mode of operation of the present invention will now be described. The circuit in FIGS. 1A and 1B is initially in the quiescent state prior to any switch closures of matrix 10. In the quiescent state, locking transistor 44 is nonconducting because there is no switch interlock signal applied to its base. Since transistor 44 is nonconducting, the voltage from source 42 is applied to the base of gating transistors 36–1 through 36–N which are therefore conducting. In latching means 24–1 through 24–N, transistors 30–1 through 30–N are conducting and transistors 28–1 through 28–N are not conducting. Because transistors 28–1 through 28–N are not conducting, no voltage is applied to the base at strobe transistor 47; therefore, transistor 47 is nonconducting. In latching means 26–1 through 26–M, transistors 40–1 through 40–M are conducting and transistors 38–1 through 38–M are not conducting. Thus, the signals on output leads V–1 through V–N and H–1 through H–M are in the "down" condition. Reset transistors 54 and 56 are conducting and the multiple switch closure transistors 66 and 68 are not conducting.

In the quiescent condition, there is a current path established from voltage supply source 42 through transistor 30–1 through transistor 36–1 through diodes 77 and 80 to ground potential 78. A similar current path exists in each of the remaining latching means 24–2 through 24–N. Consider that switch 16 of matrix 10 is closed. A current path is now established from voltage supply source 42 through resistor 48 through resistor 50–1 through the switch 16 and through conductor 14–1 to the base emitter junction of transistor 38–1 of latching means 26–1 through reset transistor 56 and resistor 84 to ground potential 78.

Transistor 38–1 now turns on and a current path is formed from voltage supply source 42, through resistor 37–1, through transistor 38–1 through reset transistor 56 and through resistor 84 to ground potential 78. Since the collector of transistor 38–1 is at a low voltage level, no base current is supplied to transistor 40–1. Thus, the latter is turned off, i.e., latch 26–1 is "set."

The base of gating transistor 36–26–is now only slightly above ground level since the voltage drop across resistor 84 is small. Thus, gating transistor 36–1 turns off, since insufficient voltage is present at the base of transistor 36–1 to overcome the required potential represented by the base-emitter junction of transistor 36–1, diode 77, and diode 80. Suppression of current through transistor 36–1 causes transistor 30–1 to turn off. When transistor 30–1 turns off, base current is applied to transistor 28–1 and transistor 28–1 is turned on and conducts. Thus, the consequences of closing switch 16 are that transistors 30–1 and 40–1 are not conducting and the output signal on lead V–1 increases to the "up" level. Transistor 36–1 is not conducting. Transistor 28–1 is conducting and transistor 38–1 is conducting and the output signal on lead H–1 increases to the "up" level. The operation of the circuit is similar when any of the other N×M matrix switches are closed except that different pairs of latching means are set and output signals are produced on different pairs of output leads for each different switch closure.

Transistor 38–1 is now conducting and a current path is now formed from voltage supply means 42 through resistor 37–1 through transistor 38–1 through reset transistor 56 through resistor 84 to ground potential 78. Since transistor 28–1 is now conducting, a second current path is formed from supply means 42 through resistor 33–1 through transistor 28–1 through the base-emitter junction of strobe transistor 47 through reset transistor 54 through resistor 76 to ground potential 78. The value of resistor 37–1 is much greater than resistor 84. The value of resistor 33–1 is much greater than resistor 76, therefore, the currents in the two current paths are primarily determined by the value of resistor 37–1 and 33–1 respectively. This magnitude of current in each current path will be referred to as a "current unit." The value of resistor 84 is chosen such that when one current unit passes through the resistor, the voltage drop across the resistor 84 equals the voltage drop across the diode 82. This places the emitters of the two transistors in the latching means 26–1 through 26–M at the same potential. This causes the latching means 26–1 through 26–M to be balanced. Likewise, the value of resistor 76 is chosen so that when one current unit passes through it, the voltage drop across resistor 76 is equal to the voltage drop across diode 80 thereby balancing latches 24–1 through 24–N.

As previously stated, the closing of the switch 16 caused a voltage change on the strobe lead 94. Before the closing of a switch, the collector of strobe transistor 47 (and therefore lead 94) is at supply voltage level. After a switch closure, the potential on lead 94 is near ground potential. This voltage change is transmitted through gate 96 to the actuation means 92 causing an output signal from actuation means 92 which is applied to the utilization means 90 and also is connected back after an appropriate time delay as a switch interlock signal applied through resistor 46 to the base of locking transistor 44, turning locking transistor 44 on. The actuation means 92 is preferably a trigger circuit which produces an output pulse having a time duration equal to the amount of time it will take the utilization means to operate. When transistor 44 conducts, it places lead 49 essentially at ground potential and as a result any further closure of the other switches of the matrix 10 will have no effect on the remaining latching means because the current path will be through transistor 44 to ground potential 78 rather than through resistor 48 and any resistor 50–1 to 50–N. The transistors 30–2 through 30–N of latching means 24–2 through 24–N continue to conduct, however, because a path is established through the diodes 52–2 through 52–N and lead 49 through the locking transistor 44 to ground potential 78.

What has been described thus far is the operation of the circuit wherein the closing of switching 16 causes the setting of latch means 24–1 and 26–1 thereby providing an up signal condition on output leads V–1 and H–1. At the same time, a voltage drop was established in the current paths which, in cooperation with clamping diodes 80 and 82, insured that the latches remained in a balanced condition. The closing of switch 16 also caused the generation of a strobe signal on lead 94 which both initiated the operation of the utilization device 90 and also resulted in a switch interlock signal which turned on locking transistor 44 to insure that any further switch closure occurring during the duration of the switch interlock signal would have no effect on the latches.

When the operation of utilization device 90 is completed, that is, when the printer has finished operation or the punches have been actuated, etc., a negative reset signal is generated by the utilization device and appears on lead 102. The reset signal on lead 102 is applied to the base of normally conducting reset transistors 54 and 56 and causes them to be nonconducting. Reset transistor 54 is in the ground path of conducting transistor 28–1 and reset transistor 56 is in the ground path for conducting transistor 38–1. When reset transistors 54 and 56 turn off and are nonconducting, transistors 28–1 and 38–1 also turn off and become nonconducting. As previously stated, when the operation of the utilization device 90 is completed, the switch interlock signal at the base of locking transistor 44 ceases and locking transistor 44 turns off and becomes nonconducting. When locking transistor 44 does not conduct, gating transistor 36–1 will conduct and transistor 30–1 turns on since a ground path is established through gating transistor 36–1 and diodes 77 and 80 to ground potential 78. When transistor 38–1 of latching means 26–1 turns off, transistor 40–1 conducts through diode 82 to ground potential 78. At the end of the duration of the reset pulse, the circuit is again in its quiescent state and another switch closure can be made.

It was described how the switch interlock signal caused an interlock condition of the circuit such that the closure of any further switches during the operation of the utilization means 90 had no effect. It may be possible that two or more switches of matrix 10 are closed simultaneously. When two or more switches of matrix 10 are closed simultaneously, a multiple switch closure signal is produced on lead 100 which is applied to and closes gate 96, preventing the strobe signal on lead 94 from triggering actuation means 92. The multiple switch closure signal is produced as follows. When two or more matrix switches are closed, two or more of the latching means 24–1 through 24–N and/or two or more latching means 26–1 through 26–M will be set.

If switches 16 and 18 are closed at the same time, latches 24–1, 24–N and 26–1 will be set. If switches 16 and 20 are closed at the same time, latches 24–1, 24–N, 26–1 and 26–M will be set. If switches 16 and 22 are closed at the same time, latches 24–1, 26–1 and 26–M will be set. Thus, when two switches are closed together, two latches in one group and possibly two latches in the other group will be set. If more than two switches are closed at the same time, an even greater number of latches will be set. Thus, in the current paths established through reset transistors 54 and 56, at least one of the current paths and possibly both of the current paths will have two or more "current units" since, as previously mentioned, a set latch produces one current unit. The voltage drop across resistor 76 or 84 for one current unit is not sufficient to turn either transistor 66 or 68 to the "on" state. However, the voltage drop caused by two or more current units across resistor 76 or resistor 84 is sufficient to turn on transistors 66 and 68 respectively. Thus, when two or more matrix switches are closed at the same time, either transistor 66 or transistor 68 or both will start conducting and a multiple switch closure signal is produced on lead 100.

Lead 100 is connected to gate 96 and the multiple switch closure signal thereon closes gate 96 thereby preventing the strobe signal from passing through and triggering actuation means 92. Therefore, the utilization means 90 is prevented from operating when an error condition occurs. If desired, a warning light may be connected to multiple switch closure lead 100 to indicate that a particular switch closure was not effective due to the fact that one or more other switches were erroneously closed at the same time.

What has been described is a circuit for use with a matrix switch which provides coded output signals on selected output leads indicative of a particular switch closure. The circuit prevents simultaneous closure of two or more switches from creating invalid codes in the utilization device and also prevents the possibility of additional switch closures within the cycle time of the utilization device from upsetting the code. Two sets of latching means are associated with the switch matrix and use of the switch matrix is made as a current steering device for directly setting both groups of latches with one switch closure. Both groups of latching means are identical in structure and are therefore economic to produce. All functions in the circuit employ a common transistor-type (NPN) and the circuit can thus be fabricated using integrated circuit techniques. Both groups of latches are reset by a total of two transistors.

Figure 2:
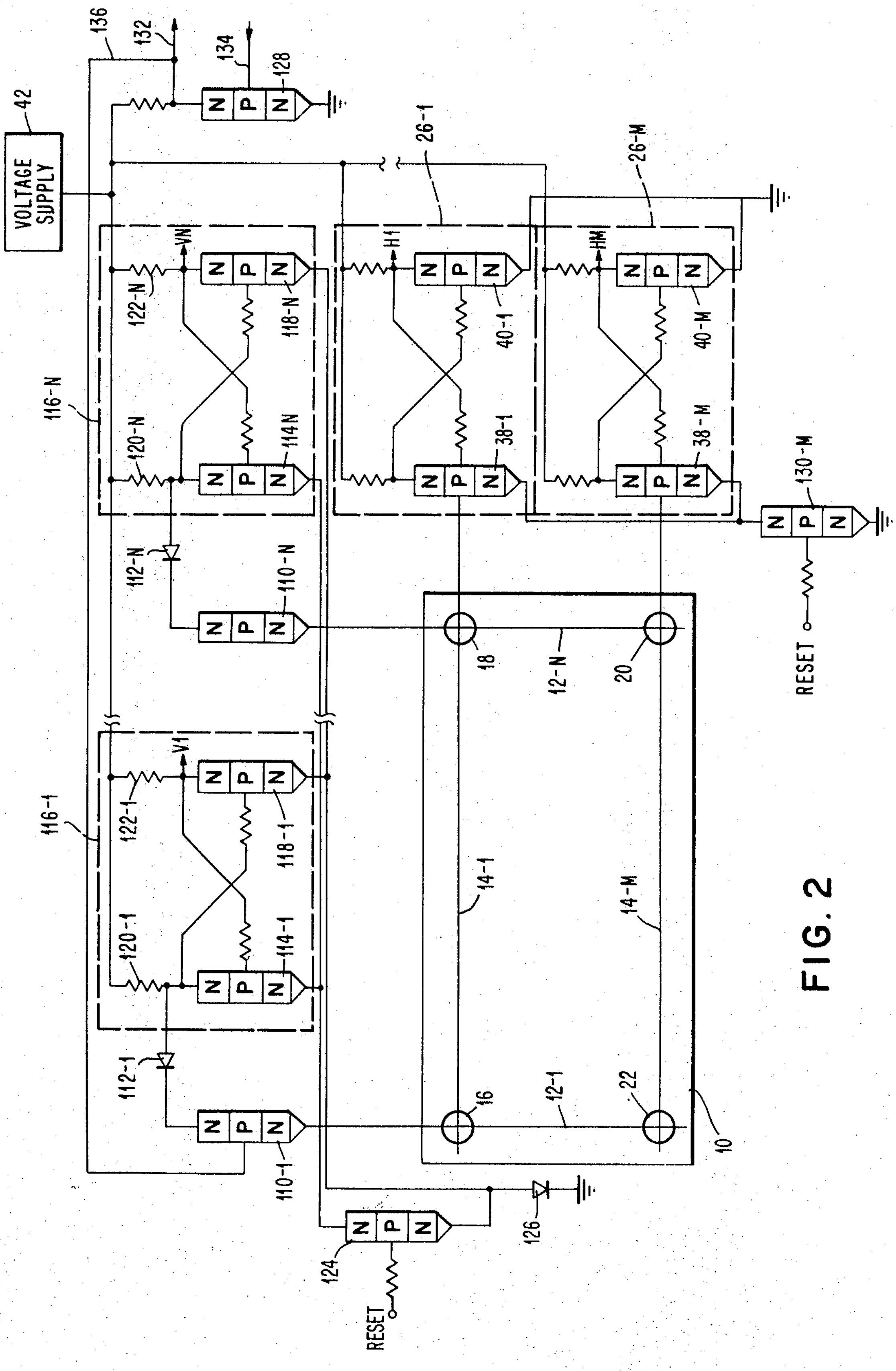
FIG. 2 shows a schematic diagram of another circuit embodiment of the present invention.

Referring to FIG. 2, another embodiment of the present invention is shown. The circuit of FIG. 2 is a slightly modified version of that of FIGS. 1A and 1B with the exceptions that the strobe signal and the switch interlock signal are produced by the same circuit element and the latches are set by a pulldown circuit connected to the collectors of the transistors in the latching means.

In FIG. 2, the multiple switch closure interlock function is not shown, however, it could be provided if desired. In FIG. 2, the matrix switch 10 and the latching means 26–1 through 26–M are identical to that of FIGS. 1A and 1B. Also, the means for actuating the switch interlock signal transistor and the means for producing the reset signal can be the same as shown in FIGS. 1A and 1B and are therefore not depicted in FIG. 2. The basic differences between the circuit of FIG. 2 and that shown in FIGS. 1A and 1B reside in the latching means connected to conductors 12–1 through 12–N. Conductor 12–1 is connected to the emitter of a transistor 110–1. The collector of transistor 110–1 is connected through a diode 112–1 to the collector of a transistor 114–1 of a latching means 116–1. Transistor 114–1 is cross-connected to another transistor 118–1 in the same manner as the latching transistors of FIGS. 1A and 1B.

Conductor 12–N is connected to emitter of a transistor 110–N which is connected through a diode 112–N to the collector of a transistor 114–N of a latching means 116–N. The collectors of the transistors in the latching means are connected through resistors to voltage supply 42. The emitters of each of the transistors 114–1 through 114–N are connected to a reset transistor 124. The emitters of each of the transistors 118–1 through 118–N are connected to ground potential through a diode 126. The bases of the transistors 110–1 through 110–N are connected to the collector of a transistor 128.

In the quiescent state, transistors 118–1 through 118–N are normally conducting. When a switch is closed, for example, switch 16, a current path is established from voltage supply 42 through the base emitter function of transistor 110–1 through switch 16 along conductor 14–1 through the base emitter function of transistor 38–1 of latching means 26–1 (which is thereby set as described in relation to FIGS. 1A and 1B) through the normally conducting reset transistor 130 to ground. When this occurs, the collector of transistor 110–1 is essentially at ground potential. The collector of transistor 114–1 is therefore also essentially at ground potential, causing transistor 118–1 to turn off. When this occurs, the collector of transistor 118–1 is at the supply voltage level producing a base bias for transistor 114–1 which then turns on. When transistor 114 turns on, its collector holds at ground potential. The increase in potential on the collector of transistor 118–1 provides the output signal on output lead V–1.

The closure of switch 16 and the conduction of transistor 110–1 also causes the potential on collector of transistor 128 to go from the supply voltage level to essentially ground potential. This potential drop is applied on lead 132 and is used as a strobe signal for the purposes described in relation to the circuit of FIGS. 1A and 1B. A switch interlock actuation signal is then applied on lead 134 from the utilization device (not shown). Lead 134 is connected to transistor 128 and the signal turns transistor 128 on and the collector of transistor 128 is then essentially at ground potential. Lead 136 connected to the collector of transistor 128 is therefore also essentially at ground potential causing the bases of transistors 110–1 through 110–N to be grounded. Thus, the closure of any further switches of matrix switch 10 during the duration of the switch interlock signal will not cause any of the remaining latches to be set.

The previous discussion related to the setting of latches 116–1 and 26–1 upon the closure of switch 16. Similarly, other pairs of latches are set in the same manner upon the closure of the other switches of matrix switch 10. When the cycle of the utilization device is completed, a reset pulse is generated as discussed in relation to FIGS. 1A and 1B. The reset pulse is applied to reset transistors 124 and 130 to reset the latches in a manner described with reference to the circuit of FIGS. 1A and 1B. Diodes 112–1 through 112–N are provided for two purposes. When a switch, such as switch 16, is closed, transistor 110–1 should conduct through the base emitter function. It is possible that conduction may take place through the emitter collector function. The diode 112–1 prevents any emitter to collector conduction. Also, when switch 16 is closed, the collector of transistor 110–1 is essentially at ground but actually might be slightly higher than ground potential due to the base emitter resistance drop of transistor 110–1 and 38–1. When latch 116–1 sets, the collector of transistor 114–1 goes to ground potential. Diode 112–1 serves as a back-bias so that conduction will take place through the base emitter function of transistor 110–1 and latch 26–1 will be set rather than permitting any conduction through the base collector function of diodes 110–1 in which instance, latch 26–1 would not be set.

While the invention has been particularly shown and described with reference to preferred embodiments thereof, it will be understood by those skilled in the art that the foregoing and other changes in form and details may be made therein without departing from the spirit and scope of the invention.

What we claim is:

1. A switching circuit comprising a first plurality of N conductors, a second plurality of M conductors, a first plurality of N latching means, each one adapted to be switched from a reset to a set condition and each one connected to a separate one of said N conductors of said switching device, a second plurality of M latching means, each one adapted to be switched from a reset to a set condition and each one connected to a separate one of said M conductors, a voltage source connected to said first and second plurality of latching means, and a plurality of N×M switching elements, each one of said switching elements connected between a separate combination of one of said N conductors and one of said M conductors, each of said N×M switching elements adapted to be closed to electrically connect a discrete one of said N conductors to a discrete one of said M conductors to produce a current path from said voltage source through said closed switch element and a discrete one of said M latching means to switch said N and M latching means connected to said discrete N and M conductors to said set condition, said latching means in said set condition being representative of the particular switching element which is closed.

2. A switching circuit according to claim 1 further including N gating means, each one connected to a separate one of said N latching means, said gating means being responsive to the current in said current path produced when an associated one of said switching elements is closed to cause an associated one of said N latching means to switch to the set condition.

3. A switching circuit according to claim 1 further including means for providing a first current path from said voltage source through said N latching means in said set condition and a second current path from said voltage source through said M latching means in said set condition to maintain said N and M latching means in said set condition.

4. A switching circuit according to claim 1 further including interlock signal means connected to said first plurality of latching means for producing an interlock signal after a switch element is closed, said interlock signal maintaining said remaining reset latching means in said reset condition.

5. A switching circuit according to claim 1 further including reset signal means connected to said first and second plurality of latching means for producing a reset signal a predetermined time after a switch element is closed for switching said discrete one of said latching means from said set to said reset condition.

6. A switching circuit according to claim 1 wherein each of said N and M latching means includes first and second transistors, having emitter, base and collector electrodes, said first transistor not conducting and said second transistor conducting in said reset condition and said first transistor conducting and said second transistor not conducting in said set condition.

7. A switching circuit according to claim 3 further including means connected to said first and second current paths for producing an output signal when the value of current in said first and second current paths exceeds a predetermined value in response to more than one of said switching elements being closed simultaneously.

8. A switching circuit according to claim 6 further including N gating transistors having collector, emitter and base electrodes, a first electrode of each of said N gating transistors connected to one of said first and second transistors of a separate one of said N latching means, a second electrode of each of said N gating transistors connected to a separate one of said N conductors, a third electrode of each of said N gating transistors connected to said voltage source, a first electrode of each of said first transistors of said M gating means connected to a separate one of said M conductors, a current path being formed when one of said switch elements is closed from said voltage source on said discrete N conductor through said closed switch and on said discrete M conductor to said first transistor in said discrete one of said M latching means connected to said discrete M conductor to switch said N and M latching means connected to said discrete conductors to the set condition wherein said first transistors in said set N and M latching means are conducting and said second transistors in said set N and M latching means are not conducting.

9. A switching circuit according to claim 8 further including means for providing a first current path from said voltage source through said N latching means in said set condition and a second current path from said voltage source through said M latching means in said set condition to maintain said N and M latching means in said set condition.

10. A switching circuit according to claim 8 further including interlock signal means connected to said first plurality of latching means for producing an interlock signal after a switch element is closed, said interlock signal maintaining said remaining reset latching means in said reset condition.

11. A switching circuit according to claim 8 further including reset signal means connected to said first and second plurality of latching means for producing a reset signal a predetermined time after a switch element is closed for switching said discrete one of said latching means from said set to said reset condition.

12. A switching circuit according to claim 8 wherein the collector electrode of each of said N gating transistors is connected to the emitter electrode of said second transistor in a separate one of said N latching means, the collector electrode of each of said N gating transistors connected to said voltage source, and the base electrode of each of said gating transistors connected to a separate one of said N conductors, the closing of a switching element causing the associated gating transistor connected thereto to be biased off thereby causing the second transistor of said latching means connected to said gating transistor to be biased off.

13. A switching circuit according to claim 8 wherein the collector electrode of each of said N gating transistors is connected to the collector electrode of said first transistor in a separate one of said N latching means, the base electrode of each of said N gating transistors connected to said voltage source, and the emitter electrode of each of said gating transistors connected to a separate one of said N conductors, the closing of a switching element causing the associated gating transistor connected thereto to be biased on thereby causing the first transistor of said latching means connected to said gating transistor to be biased on.

14. A switching circuit according to claim 8 further including a reference level source connected to emitter electrode of the first transistor of each of said N and M latching means for providing a first current path from said voltage source through the first transistor of said one of said N latching means in said set condition to said reference level source, and a second current path from said voltage source through the first transistor of said one of said M latching means in said set condition to said reference level source.

15. A switching circuit according to claim 14 further including an interlock transistor connected to the collector electrodes of said first and second transistors of said N latching means, and a source of interlock signal connected to said interlock transistor to operate said interlock transistor to prevent further latching mans being set during the duration of said interlock signal.

16. A switching circuit according to claim 14 further including a first reset transistor connected between the emitter electrodes of each of said first transistors of sand N latching means and said reference level source and a second reset transistor connected between the emitter electrodes of each of said first transistors of said M latching means and said reference level source, and a source of reset signal connected to said first and second reset transistors for operating said reset transistors to cause said set ones of said N and M latching means to switch to the reset condition.